United States Patent
Zhang et al.

(10) Patent No.: US 9,985,689 B2
(45) Date of Patent: May 29, 2018

(54) METHOD AND APPARATUS FOR COORDINATING MULTIPLE POWER LINE NETWORKS

(71) Applicant: Huawei Technologies Co., Ltd., Shenzhen (CN)

(72) Inventors: Guobin Zhang, Beijing (CN); Bucai Ye, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/789,306

(22) Filed: Oct. 20, 2017

(65) Prior Publication Data

US 2018/0041248 A1 Feb. 8, 2018

Related U.S. Application Data

(63) Continuation of application No. PCT/CN2015/095065, filed on Nov. 19, 2015.

(30) Foreign Application Priority Data

Apr. 21, 2015 (CN) .......................... 2015 1 0190891

(51) Int. Cl.
*H04B 3/54* (2006.01)
(52) U.S. Cl.
CPC .................... *H04B 3/544* (2013.01)
(58) Field of Classification Search
CPC . H04B 3/544; H04B 3/54; H04B 3/52; H04B 3/542; H04B 3/50; H04B 2203/5445
See application file for complete search history.

(56) References Cited

U.S. PATENT DOCUMENTS

2009/0175291 A1 7/2009 Galli et al.
2012/0087229 A1* 4/2012 Mantri .................. H04W 28/18
370/201

(Continued)

FOREIGN PATENT DOCUMENTS

CN 103259566 A 8/2013
CN 103607222 A 2/2014

(Continued)

*Primary Examiner* — Kabir A Timory
(74) *Attorney, Agent, or Firm* — Leydig, Voit & Mayer, Ltd.

(57) ABSTRACT

A method and an apparatus for coordinating multiple power line networks are provided. The method includes: obtaining, by a central coordinator of a first power line network of multiple power line networks, signaling timeslot information of a second power line network; and determining, according to the signaling timeslot information, whether a predetermined signaling timeslot of the first power line network conflicts with a signaling timeslot of the second power line network, and if the predetermined signaling timeslot conflicts with the signaling timeslot of the second power line network, determining, according to a predetermined backoff rule, a contention-free timeslot as a signaling timeslot of the first power line network. Signaling timeslots of different networks can be staggered as sequential as possible, which ensures non-confliction of the signaling timeslots, thereby avoiding signal interference and attenuation in a shared network.

11 Claims, 3 Drawing Sheets

(56) References Cited

U.S. PATENT DOCUMENTS

2014/0355621 A1* 12/2014 Katar ............... H04B 3/544
                                                   370/443
2015/0201336 A1*  7/2015 Shad ............... H04W 16/28
                                                   455/63.4

FOREIGN PATENT DOCUMENTS

CN         104124995 A    10/2014
CN         104270174 A     1/2015

* cited by examiner

METHOD AND APPARATUS FOR COORDINATING MULTIPLE POWER LINE NETWORKS

CROSS-REFERENCE TO RELATED APPLICATIONS

This application is a continuation of International Application No. PCT/CN2015/095065, filed on Nov. 19, 2015, which claims priority to Chinese Patent Application No. 201510190891.6, filed on Apr. 21, 2015. The disclosures of the aforementioned applications are hereby incorporated by reference in their entireties.

TECHNICAL FIELD

The present disclosure relates to the field of communication processing, and in particular, to a method and an apparatus for coordinating multiple power line networks.

BACKGROUND

An existing power line network belongs to a shared network, and a shared medium is an electric wave transmitted on a power line. Power line communication is in a bus type, and cannot enable irrelevant sites to be separated from each other as an Ethernet line does; therefore, in a case in which attenuation is not considered, the electric wave transmitted on the power line may be received by all sites on the power line. Using the power line network as an example for illustration, a structure of the power line network is shown in FIG. 1. A central coordinator (CCO) is a concentrator on a transformer, and the other sites are meters. The CCO and the meters are connected through the power line. In an actual application, several transformers are generally integrated in one place, each transformer is provided with one CCO module, a CCO module and a site (meter) belonging to the CCO module form a power line network, and multiple transformers and corresponding sites form multiple power line networks. An example of FIG. 2 indicates a scenario in which multiple power line networks included by three transformers coexist. In this example, three transformers are connected to one bus. Therefore, three power line networks to which the three transformers belong are adjacent networks.

In a shared network, a signal interference problem exists when communication is performed between sites. If two sites emit signals synchronously, the emitted signals interfere with each other, thereby leading to a communication failure. Alternatively, electromagnetic interference outside the sites in the network also causes signal interference.

In addition, a signal attenuation problem also exists in communication between sites. If two sites are far away from each other or have serious interference, a signal emitted by one site will be seriously distorted when transferred to another site, and cannot be identified.

In order to resolve the problems of signal interference and attenuation in the shared network, the prior art provides the following two solutions, which specifically include:

Solution 1 of the Prior Art: A Frequency Division Solution

Total bandwidth used for a transmission channel is divided into several frequency sub-bands, each frequency sub-band may be used as an independent transmission channel, and each network corresponds to a frequency sub-band. However, in a power line environment, there are not many available frequency bands, and in most shared networks, only one kind of frequency bands can be used. Therefore, in this solution, a frequency band is divided into multiple frequency sub-bands; as a result, the bandwidth utilization is lowered.

Solution 2 of the Prior Art: A Time Division Solution

Time division is performed on a transmission path, each timeslot can be used by only one network, and multiple networks alternately use different timeslots (for example, in a first timeslot allocation period, a network 1 uses a timeslot 1, a network 2 correspondingly uses a timeslot 2, and then a network 3 correspondingly uses a timeslot 3; and the subsequent period timeslot allocation rule is the same as that of the timeslot allocation period). Refer to FIG. 3 for details. Defects of the solution are that: in the power line network, multiple networks generally interwork at a root node, and most sub-nodes in the network can only communicate with nodes in a network to which the sub-nodes belong. Because each network exclusively occupies a timeslot, the utilization of the network bandwidth decreases by times, and a service delay is increased. Therefore, existing application requirements cannot be satisfied.

SUMMARY

The present disclosure provides a method and an apparatus for coordinating multiple power line networks, where the method and the apparatus that are provided in the present disclosure are used to resolve problems of signal interference and attenuation in an existing shared network.

According to a first aspect, a method for coordinating multiple power line networks is provided, where the multiple power line networks include a first power line network and a second power line network, the first power line network is adjacent to the second power line network, and the first power line network and the second power line network each correspond to one network timeslot within a timeslot period, where each network timeslot includes a signaling timeslot and a data timeslot, the signaling timeslot is used to carry network signaling, and the data timeslot is used to carry a data service; and the method includes:

obtaining, by a central coordinator of the first power line network, signaling timeslot information of the second power line network; and determining, by the central coordinator of the first power line network according to the signaling timeslot information, whether a predetermined signaling timeslot of the first power line network conflicts with a signaling timeslot of the second power line network; and if the predetermined signaling timeslot conflicts with the signaling timeslot of the second power line network, determining, according to a predetermined backoff rule, a contention-free timeslot as a signaling timeslot of the first power line network.

With reference to the first aspect, in a first possible implementation manner, the obtaining, by a central coordinator of the first power line network, signaling timeslot information of the second power line network includes:

receiving, by the central coordinator of the first power line network, a multi-network coordination frame, and obtaining the signaling timeslot information of the second power line network from the multi-network coordination frame.

With reference to the first possible implementation manner of the first aspect, in a second possible implementation manner, the network coordination frame is of a short frame structure.

With reference to the first aspect or either of the first and the second possible implementation manners of the first aspect, in a third possible implementation manner, the determining, according to a predetermined backoff rule, a contention-free timeslot as a signaling timeslot of the first power line network includes:

determining, according to the predetermined backoff rule, whether the first power line network needs to back off from the second power line network; and if it is determined that the first power line network needs to back off from the second power line network, selecting a signaling timeslot that does not conflict with the signaling timeslot of the second power line network as the signaling timeslot of the first power line network; or otherwise, using the predetermined signaling timeslot as the signaling timeslot of the first power line network.

With reference to the first aspect or any one of the first to the third possible implementation manners of the first aspect, in a fourth possible implementation manner, the predetermined backoff rule includes:

a signaling timeslot that does not start backs off from a signaling timeslot that already starts; or a network that cannot receive a message of a neighboring network backs off from a network that can receive a message of a neighboring network; or a network with a large network identification number backs off from a network with a small network identification number.

With reference to the first aspect or any one of the first to the fourth possible implementation manners of the first aspect, in a fifth possible implementation manner, the determining, by the central coordinator of the first power line network according to the signaling timeslot information, whether a predetermined signaling timeslot of the first power line network conflicts with a signaling timeslot of the second power line network includes:

determining, according to duration, a bandwidth end flag bit, a bandwidth end offset, and a bandwidth start offset that are carried in the signaling timeslot information, whether the predetermined signaling timeslot conflicts with the signaling timeslot of the second power line network, where the duration is used to indicate a timeslot length that the second power line network needs to apply to occupy, the bandwidth end flag bit is used to indicate whether a previous network timeslot of the second power line network ends, the bandwidth end offset is used to indicate a time offset of an end moment of the previous network timeslot of the second power line network, and the bandwidth start offset is used to indicate a time offset of a start moment of a next network timeslot of the second power line network.

According to a second aspect, a central coordinator is provided, where the central coordinator is disposed in a first power line network of multiple power line networks, and the multiple power line networks further include a second power line network, the first power line network is adjacent to the second power line network, and the first power line network and the second power line network each correspond to one network timeslot within a timeslot period, where each network timeslot includes a signaling timeslot and a data timeslot, the signaling timeslot is used to carry network signaling, and the data timeslot is used to carry a data service; and the central coordinator includes:

an obtaining unit, configured to obtain signaling timeslot information of the second power line network; and a timeslot determining unit, configured to determine, according to the signaling timeslot information, whether a predetermined signaling timeslot of the first power line network conflicts with a signaling timeslot of the second power line network; and if the predetermined signaling timeslot conflicts with the signaling timeslot of the second power line network, determine, according to a predetermined backoff rule, a contention-free timeslot as a signaling timeslot of the first power line network.

With reference to the second aspect, in a first possible implementation manner, the obtaining unit is further configured to receive a multi-network coordination frame, and obtain the signaling timeslot information of the second power line network from the multi-network coordination frame, where the network coordination frame is of a short frame structure.

With reference to the second aspect or the first possible implementation manner of the second aspect, in a second possible implementation manner, the timeslot determining unit is further configured to determine, according to the predetermined backoff rule, whether the first power line network needs to back off from the second power line network; and if it is determined that the first power line network needs to back off from the second power line network, select a signaling timeslot that does not conflict with the signaling timeslot of the second power line network as the signaling timeslot of the first power line network; or otherwise, use the predetermined signaling timeslot as the signaling timeslot of the first power line network.

With reference to the second aspect or either of the first and the second possible implementation manners of the second aspect, in a third possible implementation manner, the timeslot determining unit is further configured to determine a contention-free timeslot as the signaling timeslot of the first power line network by using any one of the following predetermined backoff rules:

a signaling timeslot that does not start backs off from a signaling timeslot that already starts;

a network that cannot receive a message of a neighboring network backs off from a network that can receive a message of a neighboring network; and a network with a large network identification number backs off from a network with a small network identification number.

With reference to the second aspect or any one of the first to the third possible implementation manners of the second aspect, in a fourth possible implementation manner, the timeslot determining unit is further configured to determine, according to duration, a bandwidth end flag bit, a bandwidth end offset, and a bandwidth start offset that are carried in the signaling timeslot information, whether the predetermined signaling timeslot conflicts with the signaling timeslot of the second power line network, where the duration is used to indicate a timeslot length that the second power line network needs to apply to occupy, the bandwidth end flag bit is used to indicate whether a previous network timeslot of the second power line network ends, the bandwidth end offset is used to indicate a time offset of an end moment of the previous network timeslot of the second power line network, and the bandwidth start offset is used to indicate a time offset of a start moment of a next network timeslot of the second power line network.

According to a third aspect, a central coordinator is provided, where the central coordinator is disposed in a first power line network of multiple power line networks, and the multiple power line networks further include a second power line network, the first power line network is adjacent to the second power line network, and the first power line network and the second power line network each correspond to one network timeslot within a timeslot period, where each network timeslot includes a signaling timeslot and a data timeslot, the signaling timeslot is used to carry network signaling, and the data timeslot is used to carry a data service; and the central coordinator includes a processor and a memory, where the processor is configured to execute the following operations by invoking a program instruction stored in the memory:

the processor is configured to obtain signaling timeslot information of the second power line network; and determine, according to the signaling timeslot information, whether a predetermined signaling timeslot of the first power line network conflicts with a signaling timeslot of the second power line network, and if the predetermined signaling timeslot conflicts with the signaling timeslot of the second power line network, determine, according to a predetermined backoff rule, a contention-free timeslot as a signaling timeslot of the first power line network.

With reference to the third aspect, in a first possible implementation manner, the central coordinator further includes a receiver, configured to receive a multi-network coordination frame, where the processor is further configured to obtain the signaling timeslot information of the second power line network from the multi-network coordination frame, where the network coordination frame is of a short frame structure.

With reference to the third aspect or the first possible implementation manner of the third aspect, in a second possible implementation manner, the processor is further configured to determine, according to the predetermined backoff rule, whether the first power line network needs to back off from the second power line network; and if it is determined that the first power line network needs to back off from the second power line network, select a signaling timeslot that does not conflict with the signaling timeslot of the second power line network as the signaling timeslot of the first power line network; or otherwise, use the predetermined signaling timeslot as the signaling timeslot of the first power line network.

With reference to the third aspect or either of the first and the second possible implementation manners of the third aspect, in a third possible implementation manner, the processor is further configured to determine a contention-free timeslot as the signaling timeslot of the first power line network by using any one of the following predetermined backoff rules:

a signaling timeslot that does not start backs off from a signaling timeslot that already starts;

a network that cannot receive a message of a neighboring network backs off from a network that can receive a message of a neighboring network; and a network with a large network identification number backs off from a network with a small network identification number.

With reference to the third aspect or any one of the first to the third possible implementation manners of the third aspect, in a fourth possible implementation manner, the processor is further configured to determine, according to duration, a bandwidth end flag bit, a bandwidth end offset, and a bandwidth start offset that are carried in the signaling timeslot information, whether the predetermined signaling timeslot conflicts with the signaling timeslot of the second power line network, where the duration is used to indicate a timeslot length that the second power line network needs to apply to occupy, the bandwidth end flag bit is used to indicate whether a previous network timeslot of the second power line network ends, the bandwidth end offset is used to indicate a time offset of an end moment of the previous network timeslot of the second power line network, and the bandwidth start offset is used to indicate a time offset of a start moment of a next network timeslot of the second power line network.

One or two of the foregoing technical solutions have at least the following technical effects:

According to the method provided in the present disclosure, a signaling timeslot is distinguished from a data timeslot, a manner of coordinating signaling timeslots between multiple networks is used to determine signaling timeslots corresponding to the networks, and signaling timeslots of different networks can be staggered sequentially, thereby ensuring non-confliction of the signaling timeslots (that is, avoiding signal interference and attenuation in a shared network). After network timeslots corresponding to power line networks are allocated within a timeslot period, operations are repeated in other periods; therefore, the solutions provided in the present disclosure can ensure periodicity of signaling sending. In addition, the method provided in the present disclosure can further improve the multi-network bandwidth utilization.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

Figure 1:
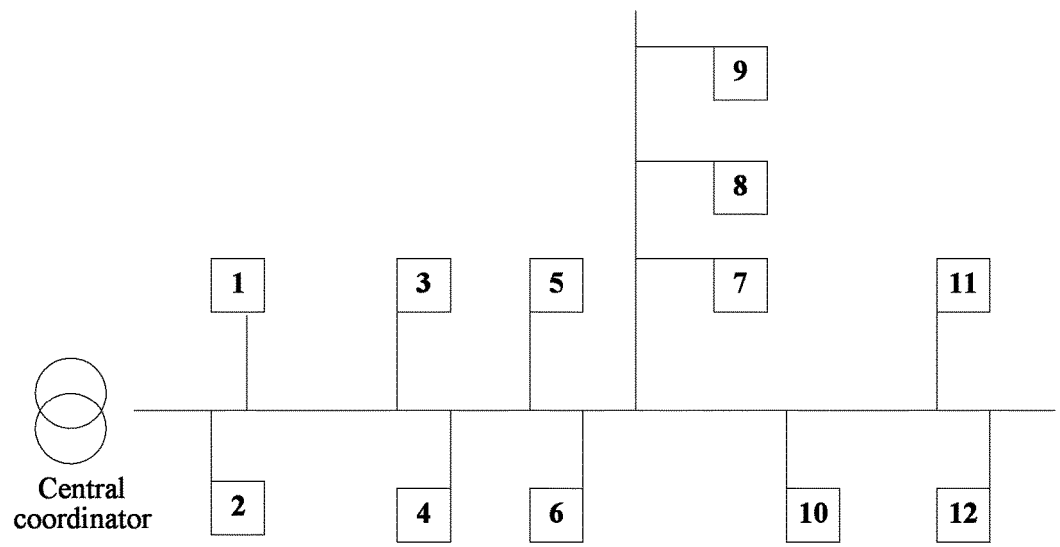
FIG. 1 is a schematic diagram of a physical topology of a shared network in the prior art.
Figure 2:
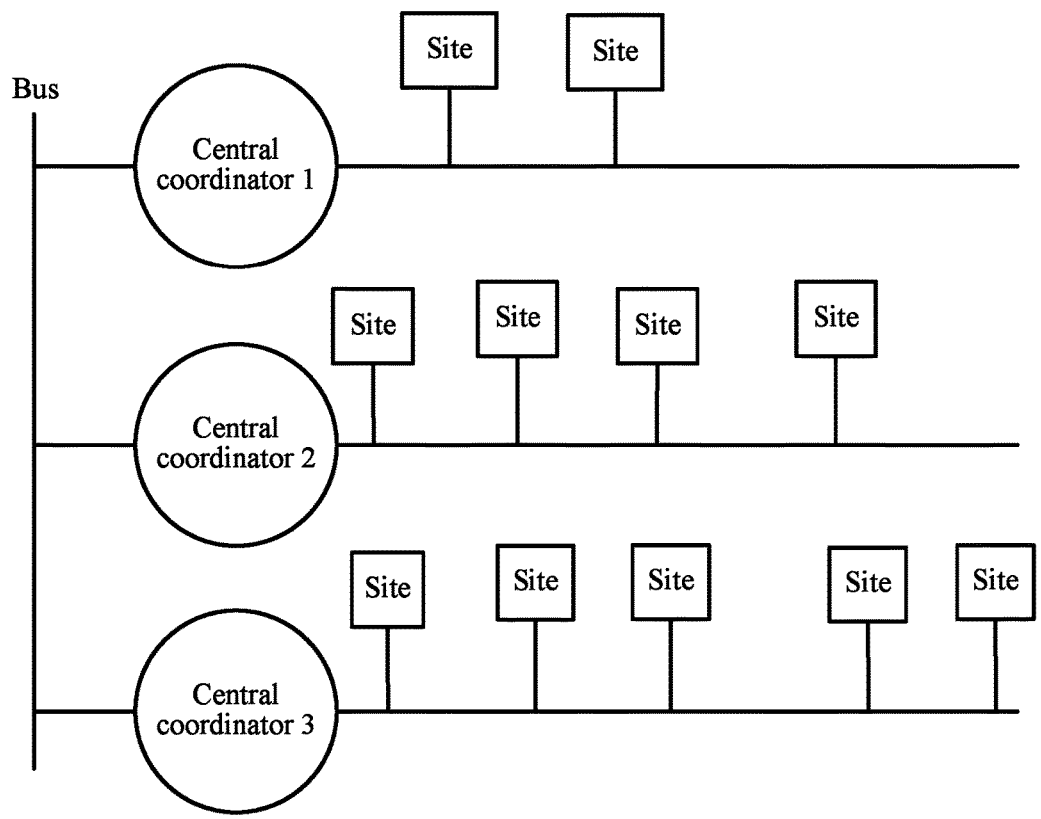
FIG. 2 is a diagram of a scenario in which multiple networks coexist in the prior art.
Figure 3:
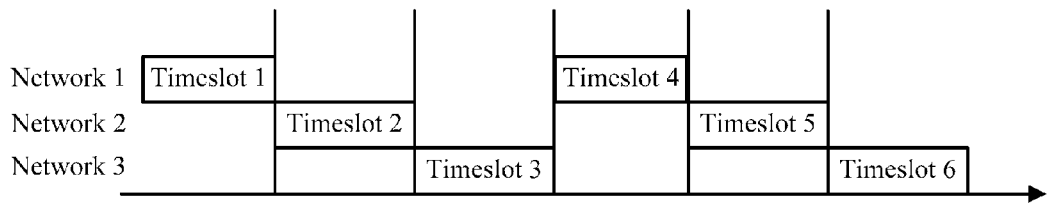
FIG. 3 is a schematic diagram of arrangement of multiple network timeslots in a time division solution of the prior art.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The following further describes the embodiments of the present disclosure in detail with reference to accompanying drawings in this specification.

In the embodiments of the present disclosure, network signaling belongs to network control information, and it needs to be ensured that the network signaling is transmitted on a channel reliably; therefore, one contention-free timeslot needs to be designated to each site (corresponding to one power line network) for transmitting the network signaling, and each site sends the network signaling in the designated contention-free timeslot in a contention free manner. The site may send a data frame in a contention manner. Based on a difference between network signaling sending and data service sending, in the method provided in the embodiments of the present disclosure, the following manners are used to plan timeslot resources of multiple power line networks, and specifically include the following:

Embodiment 1

In this embodiment, multiple power line networks form a multi-network system under a power line environment, timeslot resources of the multiple power line networks are divided into multiple network timeslots, and each network timeslot includes a signaling timeslot and a data timeslot. Specifically:

The signaling timeslot is used to carry network signaling, and is included by one or more channel contention free periods (CFP). The network signaling carries timeslot information corresponding to a network, and network control information such as a network parameter. A channel contention-free timeslot belongs to an exclusive timeslot, and data transmitted in the timeslot has high reliability.

The data timeslot is used to carry a data service, is included by one or more channel contention periods, and is sent in a carrier sense multiple access (CSMA) contention manner. The channel contention timeslot belongs to a shared timeslot, and is shared by all the sites in the network. The site sends a data frame in a contention manner.

In this embodiment of the present disclosure, a main mechanism of timeslot coordination between multiple networks is that: signaling timeslots of any two power line networks do not overlap, and a data timeslot of a power line network may overlap with a signaling timeslot or data timeslot of another network. A priority of sending data in the signaling timeslot is higher than a priority of sending data in the data timeslot. When a network monitors, in the data timeslot, that signaling is sent in another power line network, a node of the power line network backs off and waits for ending of the signaling sending. Different power line networks need to occupy different signaling timeslots. Therefore, it means that bandwidth is also different. In the coordination method provided in this embodiment of the present disclosure, signaling timeslots of different power line networks may be staggered sequentially, thereby ensuring non-confliction of the signaling timeslots and also ensuring periodicity of signal sending.

Figure 4:
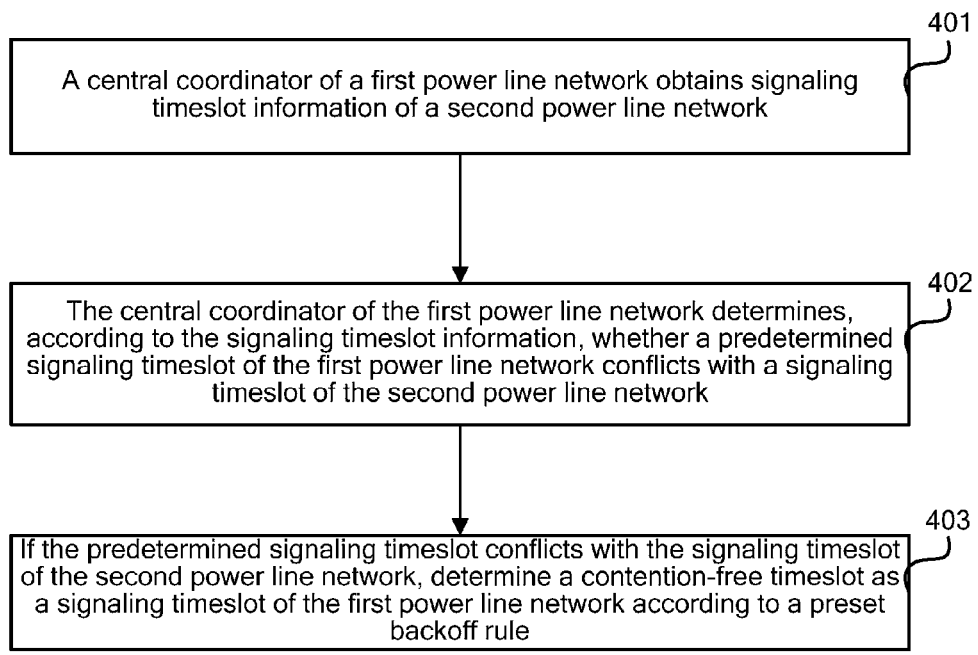
FIG. 4 is a schematic flowchart of a method for coordinating multiple power line networks according to Embodiment 1 of the present disclosure.

As shown in FIG. 4, based on the foregoing method for planning timeslot resources, the present disclosure provides a method for coordinating multiple networks under a power line environment. When multiple power line networks include a first power line network and a second power line network (multiple second power line networks may be included), the first power line network is adjacent to the second power line network (that is, the first power line network and the second power line network are connected to one bus), and the first power line network and the second power line network each correspond to one network timeslot within a timeslot period (in this embodiment, one network timeslot is allocated to each power line network in the multiple power line networks to form a timeslot period), where each network timeslot includes a signaling timeslot and a data timeslot, the signaling timeslot is used to carry network signaling, and the data timeslot is used to carry a data service; and the method specifically includes:

Step 401: A central coordinator of the first power line network obtains signaling timeslot information of the second power line network.

In this embodiment of the present disclosure, in order to coordinate multiple power line networks, when the first power line network determines a signaling timeslot of the first power line network, the first power line network needs to determine whether a signaling timeslot corresponding to an adjacent power line network conflicts with the signaling timeslot of the first power line network, to select a signaling timeslot that does not overlap with a signaling timeslot of a neighboring network.

The multiple power line networks send their timeslot information to adjacent power line networks in a particular manner, so that the adjacent power line networks can determine timeslots of the adjacent power line networks according to the received timeslot information. Therefore, a specific implementation manner of obtaining, by the central coordinator of the first power line network, signaling timeslot information of the second power line network may be that:

the central coordinator of the first power line network receives a multi-network coordination frame, and obtains the signaling timeslot information of the second power line network from the multi-network coordination frame.

Further, the network coordination frame may use a short frame structure. The short frame structure used in this embodiment of the present disclosure may be a short frame structure with a length of 16 bytes. The sending of the short frame has a high success rate; therefore, using a short frame structure can improve coordination effect. In addition, the sending of the short frame costs less time, which can reduce bandwidth occupied by a network maintaining packet and leave more bandwidth for the service, thereby improving effective utilization of bandwidth resources.

Step 402: The central coordinator of the first power line network determines, according to the signaling timeslot information, whether a predetermined signaling timeslot of the first power line network conflicts with a signaling timeslot of the second power line network.

In this embodiment, signaling timeslots of the power line networks cannot overlap; therefore, when signaling timeslots of two networks overlap in respect of time, it is considered that the signaling timeslots conflict with each other (when the first power line network receives a multi-network coordination frame, a signaling timeslot (that is, the predetermined signaling timeslot) may be allocated; therefore, after the multi-network coordination frame is received and a signaling timeslot of a neighboring network is determined, it needs to be further determined whether the signaling timeslot of the network conflicts with the signaling timeslot of the neighboring network, and coordination needs to be performed when there is a conflict).

Step 403: If the predetermined signaling timeslot conflicts with the signaling timeslot of the second power line network, determine, according to a predetermined backoff rule, a contention-free timeslot as a signaling timeslot of the first power line network.

The determining, according to a predetermined backoff rule, a contention-free timeslot (in order to ensure reliability of the signaling timeslot, after coordination of an adjacent power line network, the first power line network needs to ensure that the determined timeslot is an exclusive timeslot) as a signaling timeslot of the first power line network includes:

determining, according to the predetermined backoff rule, whether the first power line network needs to back off from the second power line network; and if it is determined that the first power line network needs to back off from the second power line network, selecting a signaling timeslot that does not conflict with the signaling timeslot of the second power line network as the signaling timeslot of the first power line network; or otherwise, using the predetermined signaling timeslot as the signaling timeslot of the first power line network, and sending an adjustment message to the second power line network, so that the second power line network reselects a timeslot as the signaling timeslot of the second power line network according to the adjustment message.

In this embodiment of the present disclosure, the backoff rule may be determined by using multiple methods, as long as it can be ensured by using the backoff rule that signaling timeslots corresponding to two networks do not overlap. The following provides several optional implementation manners, specifically including:

A. a signaling timeslot that does not start backs off from a signaling timeslot that already starts;

B. a network that cannot receive a message of a neighboring network backs off from a network that can receive a message of a neighboring network;

C. a network with a large network identification number backs off from a network with a small network identification number; and D. preset priorities of networks are compared, and a network with a low priority backs off from a network with a high priority.

In this embodiment, when there is a conflict between two networks, a backoff method may be used to determine a network that needs to back off. In addition, multiple backoff methods may be combined to determine a network that needs to back off.

In order to enable networks to send messages to each other and coordinate signaling timeslots, in this embodiment of the present disclosure, a multi-network coordination frame of a short frame structure may be used to exchange signaling timeslots. Specifically, the multi-network coordination frame may be the structure shown in table 1:

TABLE 1

| Field | Byte number | Bit | Field length (bit) |
| --- | --- | --- | --- |
| Delimiter type | 0 | 0-2 | 3 |
| Access indication | | 3 | 1 |
| Short network identifier | | 4-7 | 4 |
| Reserved | 1 | 0 | 1 |
| Short network identifier high-order byte | | 1-7 | 9 |
| | 2 | 0-1 | |
| Reserved | | 2-7 | 14 |
| | 3 | 0-7 | |
| Reserved | 4 | 0-7 | 10 |
| | 5 | 0-1 | |
| Duration | | 2-7 | 14 |
| | 6 | 0-7 | |
| Coordination flag bit | 7 | 0 | 1 |
| Bandwidth end flag bit | | 1 | 1 |
| Short network identifier low-order byte | | 2-7 | 6 |
| Bandwidth end offset | 8 | 0-7 | 16 |
| | 9 | 0-7 | |
| Bandwidth start offset | 10 | 0-7 | 16 |
| | 11 | 0-7 | |
| Reserved | 12 | 0-7 | 8 |

Specific meanings of parameters in Table 1 ("this network" appearing in the subsequent description indicates a network in which a central coordinator sending a network coordination frame is located, and may be the second power line network in this embodiment):

The delimiter type is used to indicate a frame type. When the frame is received, it may be determined, by using the delimiter, whether the frame is a multi-network coordination frame. In this embodiment, a delimiter value of the multi-network coordination frame may be 0b011.

The access indication is used to indicate a type of a network in which sending of a MAC Protocol Data Unit (MPDU) is located, where a length of the access indication is 1 bit. If a value of the access indication is 0b1, it indicates that transmission is performed in a broadband carrier communications access network; if a value of the access indication is 0b0, it indicates that transferring is performed in a homeplug nv network.

The short network identifier is used to distinguish different broadband carrier communications networks, where valid values are 1 to 15. Each broadband carrier communications network should have a unique short network identifier (SNID).

The short network identifier high-order byte is used to indicate a short network identifier of the broadband carrier communications network that may be received by a site. The short network identifier high-order byte is a 9-bit field, and indicates the short network identifier of the broadband carrier communications network that may be received by the site. Each bit corresponds to a short network identifier. Bit 0 indicates a broadband carrier communications network with a short network identifier of 7, bit 1 indicates a network with a short network identifier of 8, and the rest may be deduced by analogy; and the indicated short network identifier range is 7 to 15. When the bit value is 0, it indicates that a packet of the broadband carrier communications network is not received; and when the bit value is 1, it indicates that a packet of the broadband carrier communications network may be received.

The duration is used to indicate a length of a timeslot that this network needs to apply to occupy. The duration is a 14-bit field and indicates a length of a timeslot that this network needs to apply to occupy. A unit is 40 ms.

The coordination flag bit is used to indicate whether the current MPDU is an inter-network coordination frame, and the coordination flag bit is a 1-bit field. In the inter-network coordination frame, a value of the bit is 1.

The bandwidth end flag bit is used to indicate whether a previous bandwidth period of this network ends, and the bandwidth end flag bit is a 1-bit field. When a value of the bit is 1, it indicates that the previous bandwidth period already ends; and when the value is 0, it indicates that the previous bandwidth period does not end.

The short network identifier low-order byte is used to indicate a short network identifier of a broadband carrier communications network that may be received by a site. The short network identifier low-order byte is a 6-bit field, and each bit corresponds to one SNID. Bit 0 indicates a broadband carrier communications network with a short network identifier of 1, bit 1 indicates a network with a short network identifier of 2, and the rest may be deduced by analogy; and the indicated short network identifier range is 1 to 6. When the bit value is 0, it indicates that a packet of the broadband carrier communications network is not received; and when the bit value is 1, it indicates that a packet of the broadband carrier communications network may be received.

The bandwidth end offset is used to indicate a time offset of an end moment of a previous bandwidth timeslot, and a unit is 40 ms. When the previous bandwidth timeslot ends (the bandwidth end flag bit is 1), the offset time indicates a time offset from the end moment of the previous bandwidth timeslot to the current moment. When the previous bandwidth timeslot does not end (the bandwidth end flag bit is 0), the offset time indicates a time offset from the current moment to an end moment of a current bandwidth timeslot.

The bandwidth start offset is used to indicate a time offset of a start moment of a next bandwidth timeslot, and a unit is 40 ms. When the next bandwidth timeslot does not start, the offset time indicates a time offset from the current moment to the start moment of the next bandwidth timeslot. When the next bandwidth timeslot starts, a value of the offset time is 0.

Further, because the method provided in this embodiment of the present disclosure is for a case of multiple networks, each network may receive multi-network coordination frames of multiple neighboring networks. In order to uniformly manage timeslot allocation statuses of multiple networks, based on the parameters provided in the multi-network coordination frame of Table 1, the current network may select a table form to manage information about multiple neighboring networks, and specifically, may update information of the multi-network coordination frame into a nearby network information table, as shown in table 2:

TABLE 2

| Field | Corresponding multi-network coordination frame information |
| --- | --- |
| Neighboring network number | Short network identifier |
| Time of receiving a multi-network coordination frame | Local time of receiving a multi-network coordination frame |
| End time of a previous beacon period of a neighboring network | Local time of receiving a multi-network coordination frame + bandwidth end offset |
| Start time of a next beacon period of a neighboring network | Local time of receiving a multi-network coordination frame + bandwidth start offset |
| Neighboring network bandwidth | Duration |
| Whether this network is in one-way communication with a neighboring network | According to a short network identifier high-order byte + a short network identifier low-order byte, if a neighboring network cannot receive a multi-network coordination frame of this network, this network is in one-way communication with the neighboring network |

According to the multi-network coordination frame structure shown in table 1 and the information management manner for multiple neighboring networks provided in table 2, in this embodiment of the present disclosure, the determining, by the central coordinator of the first power line network according to the signaling timeslot information, whether a predetermined signaling timeslot of the first power line network conflicts with a signaling timeslot of the second power line network, and selecting, by the central coordinator, a signaling timeslot that does not conflict with the signaling timeslot of the second power line network as a signaling timeslot of the first power line network specifically includes:

determining, according to duration, a bandwidth end flag bit, a bandwidth end offset, and a bandwidth start offset that are carried in the signaling timeslot information, whether the predetermined signaling timeslot conflicts with the signaling timeslot of the second power line network.

During specific implementation, the central coordinator of the first power line network may determine, according to timeslot duration corresponding to the second power line network, a time length occupied by a second timeslot corresponding to the second power line network, then determine, according to a bandwidth flag bit, whether a previous network timeslot ends; and if the previous network timeslot ends, determine a time offset from an end moment of the previous bandwidth timeslot to a current moment by using offset time corresponding to the bandwidth end offset; in addition, determine, by using a bandwidth start offset, whether a next bandwidth timeslot starts, and if the next bandwidth timeslot does not start, determine, according to the offset time, a time offset from the current moment to a start moment of a next bandwidth timeslot.

The duration, the bandwidth end flag bit, the bandwidth end offset, and the bandwidth start offset provide timeslots that may be occupied by each power line network within two timeslot periods; therefore, it may be determined, according to the duration, the bandwidth end flag bit, the bandwidth end offset, and the bandwidth start offset, whether timeslots conflict with each other. In addition, when a contention-free timeslot is selected as the signaling timeslot of the first power line network, overlap of signaling timeslots may be avoided according to a time that is occupied by each power line network and that is determined according to the duration, the bandwidth end flag bit, the bandwidth end offset, and the bandwidth start offset, so as to avoid conflicts.

Embodiment 2

Figure 5:
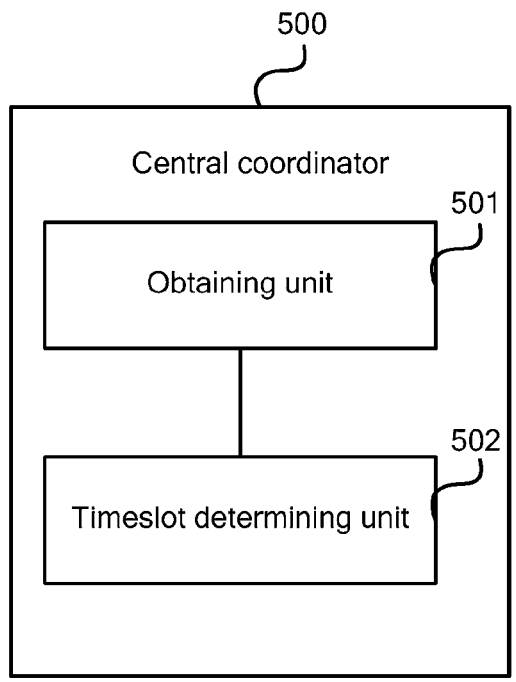
FIG. 5 is a schematic structural diagram of a central coordinator according to Embodiment 2 of the present disclosure.

As shown in FIG. 5, this embodiment provides a central coordinator. The central coordinator 500 is disposed in a first power line network of multiple power line networks, and the multiple power line networks further include a second power line network, the first power line network is adjacent to the second power line network, and the first power line network and the second power line network each correspond to one network timeslot within a timeslot period, where each network timeslot includes a signaling timeslot and a data timeslot, the signaling timeslot is used to carry network signaling, and the data timeslot is used to carry a data service; and the central coordinator includes an obtaining unit 501 and a timeslot determining unit 502.

The obtaining unit 501 is configured to obtain signaling timeslot information of the second power line network.

In this embodiment of the present disclosure, in order to coordinate multiple power line networks, when the first power line network determines a signaling timeslot of the first power line network, the first power line network needs to determine whether a signaling timeslot corresponding to an adjacent power line network conflicts with the signaling timeslot of the first power line network, to select a signaling timeslot that does not overlap with a signaling timeslot of a neighboring network.

Multiple power line networks send timeslot information of the multiple power line networks to adjacent power line networks in a particular manner, so that the adjacent power line networks determine timeslots of the adjacent power line networks according to the received timeslot information; therefore:

the obtaining unit 501 is further configured to receive a multi-network coordination frame and obtain the signaling timeslot information of the second power line network from the multi-network coordination frame, where the network coordination frame is of a short frame structure.

The timeslot determining unit 502 is configured to determine, according to the signaling timeslot information, whether a predetermined signaling timeslot of the first power line network conflicts with a signaling timeslot of the second power line network; and if the predetermined signaling timeslot conflicts with the signaling timeslot of the second power line network, determine, according to a predetermined backoff rule, a contention-free timeslot as a signaling timeslot of the first power line network.

In this embodiment, the determining, according to a predetermined backoff rule, a contention-free timeslot (in order to ensure reliability of the signaling timeslot, after coordination of an adjacent power line network, the first power line network needs to ensure that the determined timeslot is an exclusive timeslot) as a signaling timeslot of the first power line network includes:

the timeslot determining unit 502 is further configured to determine, according to the predetermined backoff rule, whether the first power line network needs to back off from the second power line network; and if it is determined that the first power line network needs to back off from the second power line network, select a signaling timeslot that does not conflict with the signaling timeslot of the second power line network as the signaling timeslot of the first power line network; or otherwise, use the predetermined signaling timeslot as the signaling timeslot of the first power line network.

There are multiple backoff rules that are specifically used by the timeslot determining unit 502, and this embodiment provides several implementable manners; therefore:

the timeslot determining unit 502 may determine a contention-free timeslot as the signaling timeslot of the first power line network by using any one of the following predetermined backoff rules:

a signaling timeslot that does not start backs off from a signaling timeslot that already starts;

a network that cannot receive a message of a neighboring network backs off from a network that can receive a message of a neighboring network; and a network with a large network identification number backs off from a network with a small network identification number.

According to the multi-network coordination frame structure shown in table 1, in this embodiment, the determining, by the central coordinator according to the signaling timeslot information, whether a predetermined signaling timeslot of the first power line network conflicts with a signaling timeslot of the second power line network, and selecting, by the central coordinator, a signaling timeslot that does not conflict with the signaling timeslot of the second power line network as a signaling timeslot of the first power line network include:

the timeslot determining unit 502 is further configured to determine, according to duration, a bandwidth end flag bit, a bandwidth end offset, and a bandwidth start offset that are carried in the signaling timeslot information, whether the predetermined signaling timeslot conflicts with the signaling timeslot of the second power line network, where the duration is used to indicate a timeslot length that the second power line network needs to apply to occupy, the bandwidth end flag bit is used to indicate whether a previous network timeslot of the second power line network ends, the bandwidth end offset is used to indicate a time offset of an end moment of the previous network timeslot of the second power line network, and the bandwidth start offset is used to indicate a time offset of a start moment of a next network timeslot of the second power line network.

Embodiment 3

Figure 6:
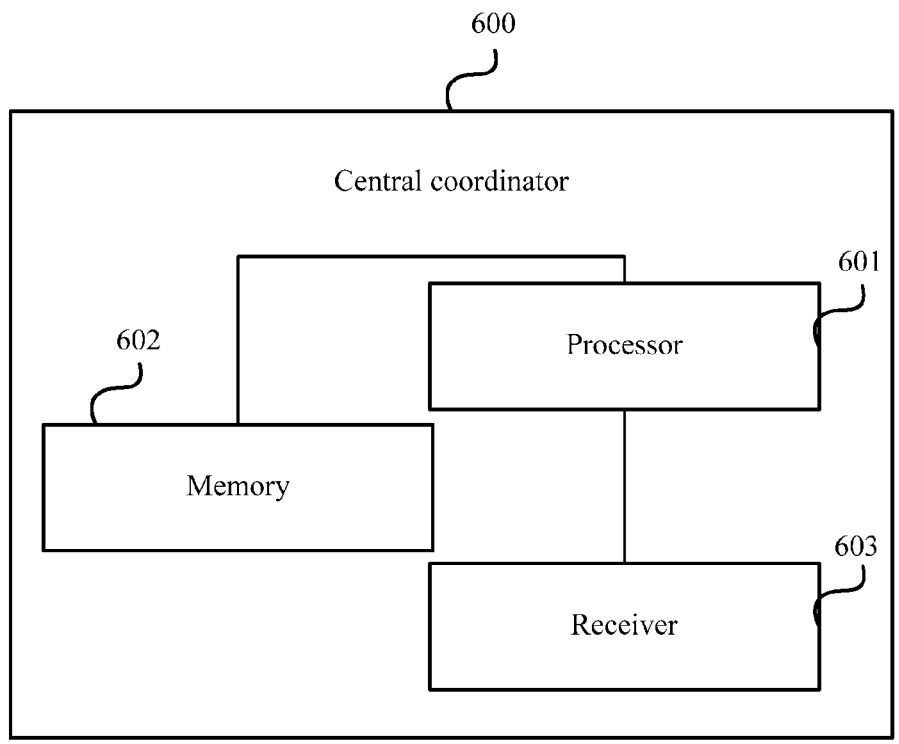
FIG. 6 is a schematic structural diagram of a central coordinator according to Embodiment 3 of the present disclosure.

As shown in FIG. 6, this embodiment of the present disclosure provides a central coordinator. The central coordinator 600 is disposed in a first power line network of multiple power line networks, and the multiple power line networks further include a second power line network, the first power line network is adjacent to the second power line network, and the first power line network and the second power line network each correspond to one network timeslot within a timeslot period, where each network timeslot includes a signaling timeslot and a data timeslot, the signaling timeslot is used to carry network signaling, and the data timeslot is used to carry a data service; and the central coordinator includes a processor 601 and a memory 602, where the processor 601 is configured to execute the following operations by invoking a program instruction stored in the memory 602:

the processor 601 is configured to obtain signaling timeslot information of the second power line network, and determine, according to the signaling timeslot information, whether a predetermined signaling timeslot of the first power line network conflicts with a signaling timeslot of the second power line network; and if the predetermined signaling timeslot conflicts with the signaling timeslot of the second power line network, determine, according to a predetermined backoff rule, a contention-free timeslot as a signaling timeslot of the first power line network.

The central processor further includes a receiver 603, configured to receive a multi-network coordination frame, where the processor 601 is further configured to obtain the signaling timeslot information of the second power line network from the multi-network coordination frame, where the network coordination frame is of a short frame structure.

In this embodiment, the determining, according to a predetermined backoff rule, a contention-free timeslot (in order to ensure reliability of the signaling timeslot, after coordination of an adjacent power line network, the first power line network needs to ensure that the determined timeslot is an exclusive timeslot) as a signaling timeslot of the first power line network includes:

the processor 601 is further configured to determine, according to the predetermined backoff rule, whether the first power line network needs to back off from the second power line network; and if it is determined that the first power line network needs to back off from the second power line network, select a signaling timeslot that does not conflict with the signaling timeslot of the second power line network as the signaling timeslot of the first power line network; or otherwise, use the predetermined signaling timeslot as the signaling timeslot of the first power line network.

In this embodiment of the present disclosure, the main function of the backoff rule is to determine which of two power line networks that conflict with each other backs off (that is, determining priorities of the two power line networks by using a particular method). Therefore, there are multiple backoff rules that are specifically used. This embodiment provides several implementable manners, and the processor 601 is further configured to determine a contention-free timeslot as the signaling timeslot of the first power line network by using any one of the following predetermined backoff rules:

a signaling timeslot that does not start backs off from a signaling timeslot that already starts;

a network that cannot receive a message of a neighboring network backs off from a network that can receive a message of a neighboring network; and a network with a large network identification number backs off from a network with a small network identification number.

According to the multi-network coordination frame structure shown in table 1, in this embodiment, a specific implementation of the determining, by the central coordinator according to the signaling timeslot information, whether a predetermined signaling timeslot of the first power line network conflicts with a signaling timeslot of the second power line network, and selecting, by the central coordinator, a signaling timeslot that does not conflict with the signaling timeslot of the second power line network as a signaling timeslot of the first power line network may be:

the processor 601 is further configured to determine, according to duration, a bandwidth end flag bit, a bandwidth end offset, and a bandwidth start offset that are carried in the signaling timeslot information, whether the predetermined signaling timeslot conflicts with the signaling timeslot of the second power line network, where the duration is used to indicate a timeslot length that the second power line network needs to apply to occupy, the bandwidth end flag bit is used to indicate whether a previous network timeslot of the second power line network ends, the bandwidth end offset is used to indicate a time offset of an end moment of the previous network timeslot of the second power line network, and the bandwidth start offset is used to indicate a time offset of a start moment of a next network timeslot of the second power line network.

The foregoing one or more technical solutions in the embodiments of the present application at least have the following technical effect:

According to the method provided in the present disclosure, first, a signaling timeslot is distinguished from a data timeslot, a manner of coordinating signaling timeslots between multiple networks is used to determine signaling timeslots corresponding to the networks, and signaling timeslots of different networks can be staggered as sequentially as possible, thereby ensuring non-confliction of the signaling timeslots (that is, avoiding signal interference and attenuation in a shared network), and also ensuring periodicity of signal sending. In addition, the method provided in the present disclosure can further improve the multi-network bandwidth utilization.

In addition, when coordinating signaling timeslots, each network sends a message by using a short frame. The sending of the short frame has a high success rate; therefore, using a short frame structure can improve coordination effect. In addition, the sending of the short frame costs less time, which can reduce bandwidth occupied by a network maintaining packet, and leave more bandwidth for the service, thereby improving effective utilization of bandwidth resources.

The method of the present disclosure is not limited to the embodiments in the description of embodiments. Other embodiments obtained by a person skilled in the art according to the technical solutions of the present disclosure also belong to the technical innovation scope of the present disclosure.

A person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for coordinating multiple power line networks, wherein the multiple power line networks comprise a first power line network and a second power line network, the method comprising:
    obtaining, by a central coordinator of the first power line network, signaling timeslot information of the second power line network, wherein the first power line network is adjacent to the second power line network, and the first power line network and the second power line network each correspond to one network timeslot within a timeslot period, wherein each network timeslot comprises a signaling timeslot and a data timeslot, the signaling timeslot is used to carry network signaling, and the data timeslot is used to carry a data service;
    determining, by the central coordinator of the first power line network according to the signaling timeslot information, whether a predetermined signaling timeslot of the first power line network conflicts with a signaling timeslot of the second power line network; and
    in response to determining that the predetermined signaling timeslot conflicts with the signaling timeslot of the second power line network, determining, according to a predetermined backoff rule, a contention-free timeslot as a signaling timeslot of the first power line network.

2. The method according to claim 1, wherein the obtaining, by the central coordinator of the first power line network, the signaling timeslot information of the second power line network comprises:
    receiving, by the central coordinator of the first power line network, a multi-network coordination frame, and
    obtaining the signaling timeslot information of the second power line network from the multi-network coordination frame.

3. The method according to claim 2, wherein the multi-network coordination frame is of a short frame structure.

4. The method according to claim 1, wherein the determining, according to the predetermined backoff rule, the contention-free timeslot as the signaling timeslot of the first power line network comprises:
    determining, according to the predetermined backoff rule, whether the first power line network needs to back off from the second power line network; and
    wherein:
        in response to determining that the first power line network needs to back off from the second power line network, selecting a signaling timeslot that does not conflict with the signaling timeslot of the second power line network as the signaling timeslot of the first power line network; or
        in response to determining that the first power line network does not need to back off from the second power line network, using the predetermined signaling timeslot as the signaling timeslot of the first power line network.

5. The method according to claim 1, wherein the predetermined backoff rule comprises:
    a signaling timeslot that does not start backs off from a signaling timeslot that already starts; or
    a network that cannot receive a message of a neighboring network backs off from a network that can receive a message of a neighboring network; or
    a network with a large network identification number backs off from a network with a small network identification number.

6. The method according to claim 1, wherein the determining whether the predetermined signaling timeslot of the first power line network conflicts with the signaling timeslot of the second power line network comprises:

determining, according to a duration, a bandwidth end flag bit, a bandwidth end offset, and a bandwidth start offset that are carried in the signaling timeslot information, whether the predetermined signaling timeslot conflicts with the signaling timeslot of the second power line network, wherein the duration is used to indicate a timeslot length that the second power line network needs to apply to occupy, the bandwidth end flag bit is used to indicate whether a previous network timeslot of the second power line network ends, the bandwidth end offset is used to indicate a time offset of an end moment of the previous network timeslot of the second power line network, and the bandwidth start offset is used to indicate a time offset of a start moment of a next network timeslot of the second power line network.

7. A central coordinator, wherein the central coordinator is disposed in a first power line network of multiple power line networks, and the multiple power line networks further comprise a second power line network, the central coordinator comprising:

a memory storing program instructions;

a receiver configured to receive a multi-network coordination frame; and a processor configured to execute the program instructions to cause the central coordinator to:

obtain signaling timeslot information of the second power line network from the multi-network coordination frame, wherein the first power line network is adjacent to the second power line network, and the first power line network and the second power line network each correspond to one network timeslot within a timeslot period, wherein each network timeslot comprises a signaling timeslot and a data timeslot, the signaling timeslot is used to carry network signaling, and the data timeslot is used to carry a data service;

determine, according to the signaling timeslot information, whether a predetermined signaling timeslot of the first power line network conflicts with a signaling timeslot of the second power line network; and in response to determining that the predetermined signaling timeslot conflicts with the signaling timeslot of the second power line network, determine, according to a predetermined backoff rule, a contention-free timeslot as a signaling timeslot of the first power line network.

8. The central coordinator according to claim 7, wherein the multi-network coordination frame is of a short frame structure.

9. The central coordinator according to claim 7, wherein the determining the contention-free timeslot as the signaling timeslot of the first power line network comprises:

determining, according to the predetermined backoff rule, whether the first power line network needs to back off from the second power line network; and wherein:

in response to determining that the first power line network needs to back off from the second power line network, select a signaling timeslot that does not conflict with the signaling timeslot of the second power line network as the signaling timeslot of the first power line network; or in response to determining that the first power line network does not need to back off from the second power line network, use the predetermined signaling timeslot as the signaling timeslot of the first power line network.

10. The central coordinator according to claim 7, wherein the predetermined backoff rule comprises:

a signaling timeslot that does not start backs off from a signaling timeslot that already starts; or a network that cannot receive a message of a neighboring network backs off from a network that can receive a message of a neighboring network; or a network with a large network identification number backs off from a network with a small network identification number.

11. The central coordinator according to claim 7, wherein the determining whether the predetermined signaling timeslot of the first power line network conflicts with the signaling timeslot of the second power line network comprises:

determining, according to a duration, a bandwidth end flag bit, a bandwidth end offset, and a bandwidth start offset that are carried in the signaling timeslot information, whether the predetermined signaling timeslot conflicts with the signaling timeslot of the second power line network, wherein the duration is used to indicate a timeslot length that the second power line network needs to apply to occupy, the bandwidth end flag bit is used to indicate whether a previous network timeslot of the second power line network ends, the bandwidth end offset is used to indicate a time offset of an end moment of the previous network timeslot of the second power line network, and the bandwidth start offset is used to indicate a time offset of a start moment of a next network timeslot of the second power line network.

* * * * *